United States Patent Office 3,470,157
Patented Sept. 30, 1969

3,470,157
6,7-ETHYLENE AND 6,7-SUBSTITUTED ETHYLENE DERIVATIVES OF THE ANDROSTANE SERIES
John A. Zderic, Mexico City, Mexico, assignor to Syntex Corporation, Apartado, Panama, a corporation of Panama
No Drawing. Continuation-in-part of application Ser. No. 544,850, Apr. 25, 1966. This application Apr. 10, 1967, Ser. No. 629,371
Int. Cl. C07c *169/22, 169/24, 173/00*
U.S. Cl. 260—239.55           14 Claims

ABSTRACT OF THE DISCLOSURE 6,7-ethylene and 6,7,-substituted ethylene derivatives of the androstane and 19-nor androstane series having anabolic activity are prepared by the photochemical cycloaddition of an olefin of the formula:

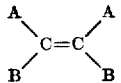

wherein A is hydrogen or fluoro, and B is hydrogen, fluoro, chloro, methyl or phenyl, to a 3-keto-$\Delta^{4,6}$-diene of the androstane, or 19-nor androstane, series.

---

This is a continuation-in-part of application, Ser. No. 544,850, filed Apr. 25, 1966 now abandoned.

This invention relates to novel cyclopentanophenanthrene derivatives and to a process for the production thereof. More specifically, this invention relates to novel 6,7-ethylene and 6,7-substituted ethylene derivatives of the androstane and 19-nor-androstane series.

The compounds of the present invention are represented by the following formula:

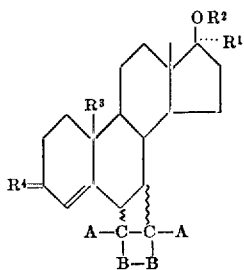

wherein $R^1$ is hydrogen, lower alkyl, lower alkenyl, lower alkylyl or lower haloalkynyl;
$R^2$ is hydrogen, tetrahydropyran-2'-yl or a hydrocarbon carboxylic acyl group of less than 12 carbon atoms;
$R^3$ is hydrogen or methyl;
$R^4$ is keto or the group

in which $R^5$ is hydrogen, tetrahydropyran-2'-yl or a hydrocarbon carboxylic acyl group of less than 12 carbon atoms;
A is hydrogen or fluoro; and
B is hydrogen, fluoro, chloro, methyl or phenyl.

The wavy line "$\xi$" at C–6 and C–7 indicates both alpha and beta configurations for the 6,7-ethylene and 6,7-substituted ethylene derivatives of the present invention, i.e.

the 6α,7α-ethylene and 6α,7α-substituted ethylene derivatives of the androstane and 19-nor-androstane series along with the 6β,7β-ethylene and 6β,7β-substituted ethylene derivatives of the androstane and 19-nor-androstane series.

The hydrocarbon carboxylic acyl groups of the compounds of the present invention contain less than 12 carbon atoms and are of a straight, branched, cyclic or cyclic-aliphatic chain structure. This structure is saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

By the term "lower alkyl" is meant a straight or branched chain hydrocarbon group containing up to six carbon atoms and thus includes methyl, ethyl, n-butyl and the like. By the term "lower alkenyl" is meant a straight or branched chain hydrocarbon group containing from 2 to 6 carbon atoms and 1 carbon-carbon double bond; it thus includes vinyl, allyl and the like. By the term "lower alkylyl" is meant a straight or branched chain hydrocarbon group containing from 2 to 6 carbon atoms and 1 carbon-carbon triple bond; it thus includes ethynyl, propargyl and the like. By the term "lower haloalkynyl" is meant an alkynyl group as defined above which contains one halo substituent, the halo substituent having an atomic number of less than 53; it thus includes chloroethynyl, bromethynyl, fluoroethynyl and the like.

The novel compounds of the present invention possess valuable pharmacological properties. The compounds of the present invention wherein $R^1$ is hydrogen, lower alkyl such as methyl, ethyl and the like, or lower alkenyl such as vinyl and the like, are valuable anabolic/androgenic agents having a favorable anabolic/androgenic ratio. The compounds of the present invention wherein $R^1$ is alkynyl, haloalkynyl and alkenyl, are valuable pituitary inhibiting and progestational agents and are useful in the treatment of various menstrual disorders and in the control and regulation of fertility. In addition the novel compounds also possess anti-estrogenic activity. These compounds can be administered via usual routes in pharmaceutically acceptable compositions at dosage rates of from 0.5γ to 5 mg./kg./day. However, dosage rates below or above this range can be employed, the most favorable dosage rate being conditioned upon the purpose for which it is administered and the response thereto.

The compounds of the present invention are prepared in accordance with the following sequence:

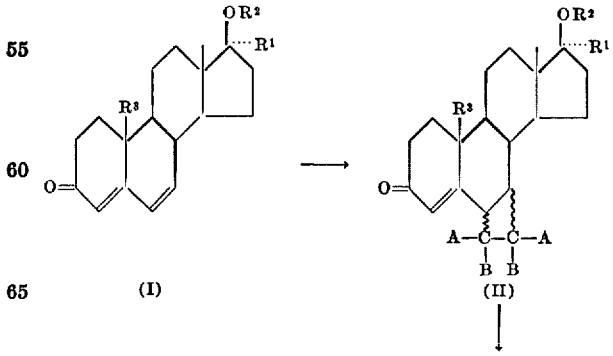

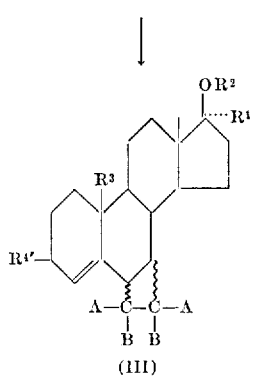

(III)

wherein R⁴' is the group

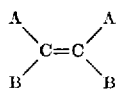

and $R^1$, $R^2$, $R^3$, $R^5$, A and B are as defined hereinabove.

In the practice of the above outlined sequence, a starting material of Formula I, i.e. an unsubstituted or appropriately substituted 3-keto-$\Delta^{4,6}$-diene and an olefin of the formula:

wherein each of A and B is as previously defined, are irradiated with ultraviolet light, in an inert organic solvent such as benzene, dioxane and the like or mixtures thereof, to effect the photochemical cycloaddition of the olefin and thereby afford a 6,7-ethylene or 6,7-substituted ethylene cycloaddition product as shown by Formula II. A preferred choice for the photochemical cycloaddition employs benzene and ultraviolet light of a wavelength of about 270 to about 330 mu at room temperature for a period of about 1 to 12 hours. Any suitable source of ultraviolet irradiation of wavelength of about 270 to about 330 mu can be employed for the photochemical cycloaddition reaction. Among such sources are commercially available high pressure mercury vapor lamps such as a 70 watt Hanau lamp, a 200 watt Hanovia lamp, and the like.

Under the above conditions, the photochemical cycloaddition of the olefin occurs at the 4,5- and 6,7-double bonds of the steroid to afford a mixture of the 4,5-ethylene and 6,7-ethylene adducts when the olefin is ethylene and a mixture of the 4,5-substituted ethylene and 6,7-substituted ethylene adducts when the olefin is a substituted ethylene. The orientation of the resulting 4,5-ethylene or 4,5-substituted ethylene group with respect to the steroid nucleus is both alpha and beta, i.e. the products having the $4\alpha,5\alpha$-, $4\beta,5\beta$-, and $4\beta,5\alpha$-configurations. The orientation of the resulting 6,7-ethylene or 6,7-substituted ethylene group with respect to the steroid nucleus is both alpha and beta, i.e. the products having the $6\alpha,7\alpha$- and $6\beta,7\beta$-configurations, the $6\alpha,7\alpha$-isomer generally being the predominant product. The mixture of products is routinely separated by a conventional procedure such as by column chromatography to yield the $6\alpha,7\alpha$-ethylene-, $6\beta,7\beta$-ethylene-, or the $6\alpha,7\alpha$-substituted ethylene- and $6\beta,7\beta$-substituted ethylene- derivatives of the present invention.

Subsequent to the photochemical cycloaddition, a 3-keto-$\Delta^4$-ene-6,7-cyclo adduct of Formula II is reduced by treatment with sodium borohydride in isopropanol to afford a corresponding $3\beta$-hydroxy-$\Delta^4$-ene-6,7-cyclo adduct of Formula III which is then treated with dihydropyran and an acid catalyst such as p-toluenesulfonic acid either alone or in an inert organic cosolvent such as benzene or with a hydrocarbon carboxylic acid anhydride and pyridine in an inert organic solvent to yield a $3\beta$-(tetrahydropyran-2'-yloxy) or a $3\beta$-acyloxy-6,7-cyclo adduct, respectively, each of which is included in Formula III.

As an alternative to the above outlined reaction sequence, a starting material of Formula I containing a free hydroxy group at C-17 is subjected to photochemical cycloaddition and then is etherified or esterified by conventional techniques known to those skilled in the art of steroid chemistry. Thus, for example, following photochemical cycloaddition, a free $17\beta$-hydroxy containing steroid of Formula II is treated with dihydropyran or a hydrocarbon carboxylic acid anhydride as described hereinabove, to yield the corresponding $17\beta$-(tetrahydropyran-2'-yloxy) or the corresponding $17\beta$-(acyloxy)-6,7-cyclo adduct.

As a further alternative to the above described sequence, a $17\beta$-hydroxy-$\Delta^4$-3-keto steroid of Formula II (II, $R^2$ is hydrogen) is reduced by treatment with sodium borohydride, or the like, as described above to furnish the corresponding $3\beta,17\beta$-dihydroxy steroid. By subjecting the thus-obtained $3\beta,17\beta$-diol to the etherification and esterification procedures described above, the corresponding $3\beta,17\beta$-bis(tetrahydropyran-2'-yloxy)- and the corresponding $3\beta,17\beta$-bis(acyloxy)-6,7-cyclo adducts, respectively, of Formula III are obtained.

The $\Delta^{4,6}$-diene starting materials of Formula I are conveniently prepared by treating the corresponding 3-keto-$\Delta^4$-ene compound with chloranil in a solvent such as t-butanol, xylene or the like, under reflux for a period of 1 to 12 hours.

The following examples are set forth to illustrate but are not intended to limit the scope of the present invention.

Example 1

A mixture of 2.0 g. of $17\beta$-hydroxyandrosta-4,6-dien-3-one in 140 ml. of benzene in a Pyrex container is irradiated with a 200 watt high pressure mercury vapor lamp at room temperature for a period of several hours while bubbling ethylene through the solution. At the end of the reaction time, which is followed by the U.V. spectra, the reaction mixture is evaporated in vacuo to dryness to furnish a residue containing the $4\alpha,5\alpha$-ethylene adduct, the $4\beta,5\beta$-ethylene adduct, the $4\beta,5\alpha$-ethylene adduct, the $6\alpha,7\alpha$-ethylene adduct and the $6\beta,7\beta$-ethylene adduct of $17\beta$-hydroxyandrosta-4,6-dien-3-one. The residue is separated by chromatography on silica eluting with ethylacetate:benzene to yield $6\alpha,7\alpha$-ethylene-$17\beta$-hydroxyandrost-4-en-3-one and $6\beta,7\beta$ - ethylene - $17\beta$-hydroxyandrost-4-en-3-one, each of which is recrystallized from methanol:methylene chloride.

Utilizing the same procedure, the following starting materials, namely $17\beta$-acetoxyandrosta-4,6-dien-3-one;
$17\beta$-(tetrahydropyran-2'-yloxy)androsta-4,6-dien-3-one;
$17\alpha$-methyl-$17\beta$-hydroxyandrosta-4,6-dien-3-one;
$17\alpha$-ethyl-$17\beta$-hydroxyandrosta-4,6-dien-3-one;
$17\alpha$-ethynyl-$17\beta$-hydroxyandrosta-4,6-dien-3-one;
$17\alpha$-methyl-$17\beta$-hydroxy-19-norandrosta-4,6-dien-3-one;
$17\alpha$-ethyl-$17\beta$-hydroxy-19-norandrosta-4,6-dien-3-one;
$17\alpha$-ethynyl-$17\beta$-hydroxy-19-norandrosta-4,6-dien-3-one; and
$17\beta$-hydroxy-19-norandrosta-4,6-dien-3-one;

are converted to the corresponding $6\alpha,7\alpha$-ethylene and $6\beta,7\beta$-ethylene compounds, namely $6\alpha,7\alpha$-ethylene-$17\beta$-acetoxyandrost-4-en-3-one, and the $6\beta,7\beta$-isomer;
$6\alpha,7\alpha$-ethylene-$17\beta$-(tetrahydropyran-2'-yloxy)androst-4-en-3-one, and the $6\beta,7\beta$-isomer;
$6\alpha,7\alpha$-ethylene-$17\alpha$-methyl-$17\beta$-hydroxyandrost-4-en-3-one, and the $6\beta,7\beta$-isomer;
$6\alpha,7\alpha$-ethylene-$17\alpha$-ethyl-$17\beta$-hydroxyandrost-4-en-3-one, and the $6\beta,7\beta$-isomer;
$6\alpha,7\alpha$-ethylene-$17\alpha$-ethynyl-$17\beta$-hydroxyandrost-4-en-3-one, and the $6\beta,7\beta$-isomer;

6α,7α-ethylene-17α-methyl-17β-hydroxy-19-norandrost-4-
    en-3-one, and the 6β,7β-isomer;
6α,7α-ethylene-17α-ethyl-17β-hydroxy-19-norandrost-4-
    en-3-one, and the 6β,7β-isomer;
6α,7α-ethylene-17α-ethynyl-17β-hydroxy-19-norandrost-
    4-en-3-one, and the 6β,7β-isomer; and
6α,7α-ethylene-17β-hydroxy-19-norandrost-4-en-3-one,
    and the 6β,7β-isomer, respectively.

Example 2

Utilizing the procedure of Example 1 with the exception of substituting tetrafluoroethylene in place of ethylene, the corresponding 6α,7α-tetrafluoroethylene and 6β,7β-tetrafluoroethylene compounds are obtained, namely 6α,7α-tetrafluoroethylene-17β-hydroxyandrost-4-en-3-one,
    and the 6β,7β-isomer;
6α,7α-tetrafluoroethylene-17β-acetoxyandrost-4-en-3-
    one, and the 6β,7β-isomer;
6α,7α-tetrafluoroethylene-17β-(tetrahydropyran-2'-
    yloxyl)androst-4-en-3-one, and the 6β,7β-isomer;
6α,7α-tetrafluoroethylene-17α-methyl-17β-hydroxy-
    androst-4-en-3-one, and the 6β,7β-isomer;
6α,7α-tetrafluoroethylenen-17α-ethyl-17β-hydroxyandrost-
    4-en-3-one, and the 6β,7β-isomer;
6α,7α-tetrafluoroethylene-17α-ethynyl-17β-hydroxyan-
    drost-4-en-3-one, and the 6β,7β-isomer;
6α,7α-tetrafluoroethylene-17α-hydroxy-19-norandrost-4-
    en-3-one, and the 6β,7β-isomer;
6α,7α-tetrafluoroethylene-17α-ethyl-17β-hydroxy-19-nor-
    androst-4-en-3-one, and the 6β,7β-isomer;
6α,7α-tetrafluoroethylene-17α-ethynyl-17β-hydroxy-19-
    norandrost-4-en-3-one, and the 6β,7β-isomer; and
6α,7α-tetrafluoroethylene-17β-hydroxy-19-norandrost-4-
    en-3-one, and the 6β,7β-isomer, respectively.

Example 3

Utilizing the procedure of Example 1, the following starting materials are reacted with the olefin as indicated to afford the 6α,7α-substituted ethylene and 6β,7β-substituted ethylene compounds of the present invention, namely

| Starting material | Olefin | Final product |
|---|---|---|
| 17α-allyl-17β-hydroxy-19-norandrosta-4,6-dien-3-one. | 1,2-difluoroethylene. | 6α,7α-(1',2'-difluoro)-ethylene-17α-allyl-17β-hydroxy-19-norandrost-4-en-3-one, and the 6β,7β-isomer. |
| 17α-chloroethynyl-17β-hydroxyandrosta-4,6-dien-3-one. | 1,2-difluoroethylene. | 6α,7α-(1',2'-difluoro)-ethylene-17α-chloroethynyl-17β-hydroxyandrost-4-en-3-one, and the 6β,7β-isomer. |
| 17α-butyl-17β-hydroxy-19-nor-androsta-4,6-dien-3-one. | Butene-2. | 6α,7α-(1',2'-dimethyl)-ethylene-17α-butyl-17β-hydroxy-19-norandrost-4-en-3-one, and the 6β,7β-isomer. |
| 17β-hydroxyandrosta-4,6-dien-3-one. | 1,2-dichloro-1,2-difluoroethylene. | 6α,7α-(1',2'-dichloro-1',2'-difluoro)-ethylene-17β-hydroxyandrost-4-en-3-one, and the 6β,7β-isomer. |
| 17β-hydroxy-19-norandrosta-4,6-dien-3-one. | 2,3-difluorobutene-2. | 6α,7α-(1',2'-difluoro)-1',2'-dimethyl)ethylene-17β-hydroxy-19-norandrost-4-en-3-one-and the 6β,7β-isomer. |
| 17α-propargyl-17β-hydroxy-19-norandrosta-4,6-dien-3-one. | Butene-2. | 6α,7α-(1',2'-dimethyl)-ethylene-17α-propargyl-17β-hydroxy-19-norandrost-4-en-3-one, and the 6β,7β-isomer. |

Example 4

Two milliliters of dihydropyran are added to a solution of 1 g. of 6α,7α-ethylene-17β-hydroxy-19-norandrost-4-en-3-one in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 6α,7α-ethylene-17β-(tetrahydropyran-2'-yloxy)-19-norandrost-4-en-3-one which is recrystallized from pentane.

Utilizing the above procedure, the following starting materials,

6α,7α-ethylene-17β-hydroxyandrost-4-en-3-one;
6α,7α-tetrafluoroethylene-17β-hydroxy-19-norandrost-4-
    en-3-one;
6α,7α-tetrafluoroethylene-17β-hydroxyandrost-4-en-3-
    one; and
6α,7α-(1',2'-difluoro)ethylene-17α-allyl-17β-hydroxy-19-
    norandrost-4-en-3-one;

are converted to the corresponding 17β-(tetrahydropyran-2'-yloxy) compounds, namely 6α,7α-ethylene-17β-(tetrahydropyran-2'-yloxy)androst-4-
    en-3-one;
6α,7α-tetrafluoroethylene-17β-(tetrahydropyran-2'-
    yloxy)-19-norandrost-4-en-3-one;
6α,7α-tetrafluoroethylene-17β-(tetrahydropyran-2'-
    yloxy)androst-4-en-3-one; and
6α,7α-(1',2'-difluoro)ethylene-17α-allyl-17β-tetrahy-
    dropyran-2'-yloxy)-19-norandrost-4-en-3-one; respectively.

By repeating the above procedure with the 6β,7β-isomer of the above starting materials, there are obtained the corresponding 6β,7β-isomers of the above final products.

Example 5

A mixture of 1 g. of 6α,7α-ethylene-17β-hydroxy-19-norandrost - 4-en-3-one, 4 ml. of pyridine and 2 ml. of acetic anhydride is allowed to stand at room temperature for 15 hours. The mixture is then poured into ice water and the solid which forms is collected by filtration, washed with water, and dried to yield 6α,7α-ethylene-17β-acetoxy-19-norandrost-4-en-3-one which can be further purified through recrystallization from acetone:hexane.

Utilizing the above procedure, the novel starting material is treated with propionic anhydride, caproic anhydride, enanthic anhydride, and cyclopentylpropionic anhydride, respectively, to obtain the 17β-propionate, 17β-caproate, 17β-enanthate, and 17β-cyclopentylpropionate, respectively.

By repeating the above procedure with the 6β,7β-isomer, there are obtained the corresponding 6β,7β-final products.

Example 6

A mixture of 1 g. of sodium borohydride in 3 ml. of water is added to an ice-cooled solution of 1 g. of 6α,7α-tetrafluoroethylene - 17β - hydroxyandrost-4-en-3-one in 120 ml. of methanol and the mixture is then allowed to stand for 16 hours at room temperature. The excess reagent is decomposed by addition of acetic acid and the mixture is then concentrated to a small volume in vacuo and diluted with water. The product is extracted with ethyl acetate and these extracts are washed with water, dried and evaporated to yield 6α,7α-tetrafluoroethylene-androst-4-en-3β,17β-diol which may be further purified by recrystallization from acetone:hexane.

Four milliliters of dihydropyran are added to a solution of 1 g. of 6α,7α - tetrafluoroethyleneandrost-4-en-3β,17β-diol in 15 ml. of benzene. About 1 ml. is removed by distillation to remove moisture and 0.5 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 6α,7α - tetrafluoroethylene-3β,17β-bis(tetrahydropyran-2'-yloxy)androst-4-ene which is recrystallized from pentane.

By repeating the above procedure with the 6β,7β-isomer, there is obtained the corresponding 6β,7β-final product, namely 6β,7β - tetrafluoroethylene-3β,17β-bis(tetrahydropyran-2'-yloxy)androst-4-ene.

Example 7

Utilizing the reduction step of Example 6, 6α,7α-ethylene - 17α - ethynyl - 17β-hydroxy-19-norandrost-4-en-3-one is converted to the corresponding 3β,17β-diol.

A mixture of 1 g. of 6α,7α-ethylene-17α-ethynyl-19-norandrost-4-ene-3β,17β-diol, 4 ml. of pyridine and 4 ml. of acetic anhydride is allowed to stand at room temperature for 15 hours. The mixture is then poured into ice water and the solid which forms is collected by filtration, washed with water, and dried to yield 3β,17β - diacetoxy-6α,7α - ethylene-17α-ethynyl-19-norandrost-4-ene which can be further purified through recrystallization from acetone:hexane.

By repeating the above procedure with the 6β,7β-isomer, there is obtained the corresponding 6β,7β-final product, namely 3β,17β-diacetoxy-6β,7β-ethylene - 17α - ethynyl-19-norandrost-4-ene.

By repeating the above procedure with the exception of substituting caproic anhydride and then proprionic anhydride in place of acetic anhydride, there are obtained the corresponding 3β,17β-dicaproates and 3β,17β-diproprionates, respectively.

Example 8

A mixture of 2 g. of 17α-ethynyl-17β-hydroxy-19-norandrosta - 4,6 - diene-3-one and 5 g. of 1,2-dichloroethylene in a Pyrex container in 140 ml. of benzene is irradiated with a 200 watt high pressure mercury lamp with a Pyrex filter at room temperature for a period of three hours. After the end of the reaction, the mixture of reaction products is evaporated to dryness to furnish a residue containing the 4α,5α - (1',2'-dichloro)ethylene adduct, the 4β,5β - (1',2'-dichloro)ethylene adduct, the 4β,5α - (1',2'-dichloro)ethylene adduct, the 6α,7α-(1',2'-dichloro)ethylene adduct, the 6β,7β - (1',2'-dichloro)ethylene adduct of 17α - ethynyl - 17β - hydroxy-19-norandrosta 4,6-diene-3-one. The residue is separated by chromatography on silica eluting with ethyl acetate:benzene to yield 6α,7α - (1',2'-dichloro)ethylene-17α-ethynyl - 17β - hydroxy-19-norandrost-4-en-3-one and 6β,7β-(1',2' - dichloro)ethylene - 17α-ethynyl-17β-hydroxy-19-norandrost - 4-en-3-one, each of which is recrystallized from methanol:methylene chloride.

Utilizing the above procedure, the following starting materials are reacted with the following olefins to afford the 6α,7α-substituted and 6β,7β-substituted ethylene derivatives as indicated below.

| Starting material | Olefin | Final product |
|---|---|---|
| 17α-methyl-17β-hydroxyandrosta-4,6-dien-3-one. | Stilbene | 6,7α-(1',2'-diphenyl)-ethylene-17α-methyl-17β-hydroxyandrost-4-en-3-one and the 6β,7β-isomer. |
| 17β-hydroxy-19-norandrosta-4,6-dien-3-one. | α,α'-Difluoro stilbene. | 6α,7α-(1',2'-difluoro-1',2'-diphenyl)ethylene-17β-hydroxy-19-norandrost-4-en-3-one, and the 6β,7β-isomer. |
| 17α-methyl-17β-hydroxy-19-norandrosta-4,6-dien-3-one. | 1,2-dichloro-ethylene. | 6α,7α-(1',2'-dichloro)-ethylene-17α-methyl-17β-hydroxy-19-norandrost-4-en-3-one, and the 6β,7β-isomer. |

Example 9

A mixture of 2.0 g. of 17β-hydroxyandrosta-4,6-dien-3-one in 140 ml. of benzene is irradiated with a 70 watt Hanau high pressure mercury vapor lamp with a Pyrex filter at room temperature for a period of several hours while bubbling ethylene through the solution. At the end of the reaction time, which may be followed by the U.V. spectra, the reaction product is evaporated in vacuo to dryness, chromatographed on silica eluting with ethylacetate:benzene to yield 6α,7α-ethylene-17β-hydroxyandrost-4-en-3-one which is recrystallized from methanol:methylene chloride.

Example 10

Utilizing the procedure of Example 6, 6α,7α-ethylene-17β-acetoxyandrost-4-en-3-one is converted to the corresponding 3β - (tetrahydropyran-2'-yloxy)-6α,7α-ethylene-17β-acetoxyandrost-4-ene.

By repeating the above procedure with the 6β,7β-isomer of the above starting material, there is obtained the corresponding 6β,7β-final product, namely 3β-(tetrahydropyran-2'-yloxy)-6β,7β - ethylene - 17β - acetoxyandrost-4-ene.

Example 11

Utilizing the reduction step of Example 6, 6α,7α-ethylene-17β-(tetrahydropyran - 2' - yloxy)androst-4-en-3-one is converted to the corresponding 3β-hydroxy-6α,7α-ethylene-17β-(tetrahydropyran-2'-yloxy)androst-4-ene.

Utilizing the esterification reaction of Example 5 with acetic anhydride, the latter 3β-hydroxy compound is converted to the corresponding 3β-acetoxy-6α,7α-ethylene-17β-(tetrahydropyran-2'-yloxy)androst-4-ene.

By repeating the above procedure with the 6β,7β-isomer, there is obtained the corresponding 6β,7β-final product, namely 3β - acetoxy-6β,7β-ethylene-17β-(tetrahydropyran-2'-yloxy)androst-4-ene.

Example 12

A solution of 1 g. of 3β-(tetrahydropyran-2'-yloxy)-6α,7α-ethylene-17-β-acetoxyandrost - 4 - ene in 50 ml. of methanol is heated at reflux for three hours with a solution of potassium hydroxide in 1 ml. of water. The reaction mixture is then poured into ice water and the solid which forms is collected by filtration, washed with water to neutrality and dried to yield 3β-(tetrahydropyran-2'-yloxy)-6α,7α-ethylene-17β-hydroxyandrost-4-ene which is recrystallized from methylene chloride:ether.

By repeating the above procedure with the 6β,7β-isomer of the above starting material, there is obtained the corresponding 3β-(tetrahydropyran - 2' - yloxy)-6β,7β-ethylene-17β-hydroxyandrost-4-ene.

Example 13

To a mixture of 1 g. of 3β-acetoxy-6α,7α-ethylene-17β-(tetrahydropyran-2'-yloxy)androst-4-ene in 30 ml. of acetic acid is added 0.5 ml. of 2 N hydrochloric acid. The mixture is allowed to stand five hours at room temperature and then diluted with ice water and extracted several times with methylene chloride. The combined extracts are washed with water to neutrality, dried over sodium sulfate and evaporated to dryness to yield 3β-acetoxy-6α,7α-ethylene-17β - hydroxyandrost-4-ene which is recrystallized from acetone:hexane.

By repeating the above procedure with the 6β,7β-isomer of the above starting material, there is obtained the corresponding 3β - acetoxy - 6β,7β - ethylene-17β-hydroxyandrost-4-ene.

What is claimed is:
1. A compound of the formula:

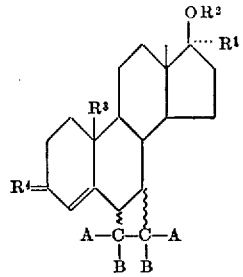

wherein
R[1] is hydrogen, lower alkyl, lower alkenyl, lower alkynyl or lower haloalkynyl;
R[2] is hydrogen, tetrahydropyran-2'-yl or a hydrocarbon carboxylic acyl group of less than 12 carbon atoms;

R³ is hydrogen or methyl;
R⁴ is keto or the group

in which R⁵ is hydrogen, tetrahydropyran-2'-yl or a hydrocarbon carboxylic acyl group of less than 12 carbon atoms;
A is hydrogen or fluoro; and
B is hydrogen, fluoro, chloro, methyl or phenyl.

2. A compound according to claim 1 wherein R¹ is hydrogen, methyl, ethyl or ethynyl; R² is hydrogen, tetrahydropyran-2'-yl or acetyl; and each of A and B is hydrogen or fluoro.

3. A compound according to claim 2 wherein each of R¹, R² and R³ is hydrogen; R⁴ is keto; and each of A and B is hydrogen.

4. A compound according to claim 2 wherein each of R¹ and R² is hydrogen; R³ is methyl; R⁴ is keto; and each of A and B is hydrogen.

5. A compound according to claim 2 wherein each of R¹ and R³ is hydrogen; R² is tetrahydropyran-2'-yl; R⁴ is keto; and each of A and B is hydrogen.

6. A compound according to claim 2 wherein R¹ is hydrogen; R² is tetrahydropyran-2'-yl; R₃ is methyl; R⁴ is keto; and each of A and B is hydrogen.

7. A compound according to claim 2 wherein R¹ is ethynyl; R² is hydrogen; R³ is methyl; R⁴ is keto; and each of A and B is hydrogen.

8. A compound according to claim 2 wherein R¹ is ethynyl; each of R² and R³ is hydrogen; R⁴ is keto; and each of A and B is fluoro.

9. A compound according to claim 2 wherein R¹ is ethyl; each of R² and R³ is hydrogen; R⁴ is keto; and each of A and B is hydrogen.

10. A compound according to claim 2 wherein R¹ is ethyl; each of R² and R³ is hydrogen; R⁴ is keto; and each of A and B is fluoro.

11. A compound according to claim 2 wherein each of R¹, R², and R³ is hydrogen; R⁴ is keto; and each of A and B is fluoro.

12. A compound according to claim 2 wherein each of R¹ and R² is hydrogen; R³ is methyl; R⁴ is keto; and each of A and B is fluoro.

13. A compound according to claim 2 wherein each of R¹ and R³ is hydrogen; R² is tetrahydropyran-2'-yl; R⁴ is keto; and each of A and B is fluoro.

14. A compound according to claim 2 wherein R¹ is hydrogen; R² is tetrahydropyran-2'-yl; R³ is methyl; R⁴ is keto; and each of A and B is fluoro.

References Cited

UNITED STATES PATENTS 3,356,677   12/1967   Beard et al.

HENRY A. FRENCH, Primary Examiner

U.S. Cl. X.R.

204—158; 260—397.4, 397.5, 999

UNITED STATES PATENT OFFICE
CERTIFICATE OF CORRECTION

Patent No. 3,470,157         Dated September 30, 1969

Inventor(s) John A. Zderic

It is certified that error appears in the above-identified patent and that said Letters Patent are hereby corrected as shown below:

Column 1, lines 37 through 49, the formula should appear as follows:

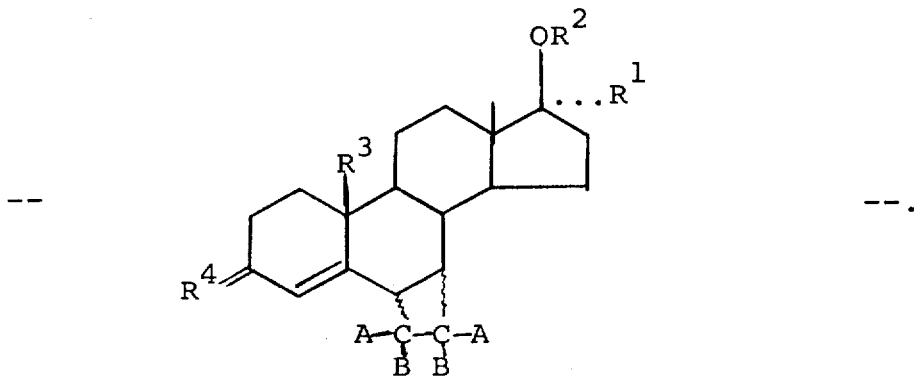

SIGNED AND
SEALED

JUN 23 1970

(SEAL)
Attest:

Edward M. Fletcher, Jr.
Attesting Officer

WILLIAM E. SCHUYLER, JR.
Commissioner of Patents